United States Patent
Yang et al.

(10) Patent No.: US 11,757,143 B2
(45) Date of Patent: Sep. 12, 2023

(54) BATTERY MODULE WITH COOLING CARTRIDGE AND BATTERY SYSTEM THEREOF

(71) Applicants: PROLOGIUM TECHNOLOGY CO., LTD., Taoyuan (TW); Prologium Holding Inc., Grand Cayman (KY)

(72) Inventors: Szu-Nan Yang, Taoyuan (TW); Meng-Hung Wu, Taoyuan (TW)

(73) Assignees: PROLOGIUM TECHNOLOGY CO., LTD., Taoyuan (TW); Prologium Holding Inc., Grand Cayman (KY)

( * ) Notice: Subject to any disclaimer, the term of this patent is extended or adjusted under 35 U.S.C. 154(b) by 45 days.

(21) Appl. No.: 17/673,306

(22) Filed: Feb. 16, 2022

(65) Prior Publication Data

US 2022/0302517 A1  Sep. 22, 2022

(30) Foreign Application Priority Data

Mar. 18, 2021 (TW) .................................. 110109698

(51) Int. Cl.
*H01M 10/613* (2014.01)
*H01M 50/186* (2021.01)
(Continued)

(52) U.S. Cl.
CPC ..... *H01M 10/613* (2015.04); *H01M 10/6555* (2015.04); *H01M 50/119* (2021.01);
(Continued)

(58) Field of Classification Search
CPC ........... H01M 10/613; H01M 10/6555; H01M 50/186; H01M 50/531; H01M 50/184;
(Continued)

(56) References Cited

U.S. PATENT DOCUMENTS

2015/0064535 A1  3/2015  Seong et al.
2017/0187082 A1*  6/2017  Zhao .................... H01M 10/655
(Continued)

FOREIGN PATENT DOCUMENTS

CN   104412439 A   3/2015
CN   205992578 U   3/2017
(Continued)

OTHER PUBLICATIONS

EPO machine generated English translation of DE-102013203094-A1 (Year: 2014).*
European Search Report of EP 22157462, dated Aug. 23, 2022.

*Primary Examiner* — Christopher P Domone
*Assistant Examiner* — Kimberly Wyluda
(74) *Attorney, Agent, or Firm* — RABIN & BERDO, P.C.

(57) ABSTRACT

The invention provides a battery module with cooling cartridge and battery system thereof. The cooling cartridge is utilized to be disposed between the battery units stacked in a single axis. The supporting portion of the cooling cartridge is directly contacted in a large area to the current collecting sheet of the battery unit. And the wing portions, extended from the two sides of the supporting portion, are directly contacted to the inner sidewalls of the metal housing. Therefore, a large-area heat dissipating path for the battery cell is provided, and the performance and stability of the battery cell are greatly improved.

9 Claims, 13 Drawing Sheets

(51) Int. Cl.
*H01M 50/184* (2021.01)
*H01M 50/119* (2021.01)
*H01M 50/593* (2021.01)
*H01M 10/6555* (2014.01)
*H01M 50/531* (2021.01)
*H01M 50/222* (2021.01)
*H01M 50/193* (2021.01)

(52) U.S. Cl.
CPC ....... *H01M 50/184* (2021.01); *H01M 50/186* (2021.01); *H01M 50/193* (2021.01); *H01M 50/531* (2021.01); *H01M 50/593* (2021.01); *H01M 50/222* (2021.01)

(58) Field of Classification Search
CPC . H01M 50/119; H01M 50/593; H01M 50/222
See application file for complete search history.

(56) References Cited

U.S. PATENT DOCUMENTS

| | | |
|---|---|---|
| 2018/0047951 A1 | 2/2018 | Lee et al. |
| 2018/0205118 A1* | 7/2018 | Chu .................... H01M 50/434 |
| 2020/0052341 A1 | 2/2020 | Yang |
| 2020/0153063 A1 | 5/2020 | Shimazaki |

FOREIGN PATENT DOCUMENTS

| | | | |
|---|---|---|---|
| CN | 107431257 A | 12/2017 | |
| CN | 107851747 A | 3/2018 | |
| CN | 109314281 A | 2/2019 | |
| CN | 111180825 A | 5/2020 | |
| DE | 102013203094 A1 * | 9/2014 | ........ H01M 10/0413 |
| JP | H07240347 A | 9/1995 | |
| JP | 2011159491 A | 8/2011 | |
| JP | 2020024921 A | 2/2020 | |

* cited by examiner

BATTERY MODULE WITH COOLING CARTRIDGE AND BATTERY SYSTEM THEREOF

CROSS REFERENCES TO RELATED APPLICATIONS

The present application claims priority to Taiwanese Patent Application 110109698 filed in the Taiwanese Patent Office on Mar. 18, 2021, the entire contents of which is being incorporated herein by reference.

BACKGROUND OF THE INVENTION

Field of Invention

The present invention relates to a battery module, in particular to a battery module and the battery system thereof with the cooling cartridge.

Related Art

In recent years, with the rapid development of various portable electronic products, electric vehicles, power storage stations, there is a high demand for energy storage devices with both high energy storage density and environmental protection. The ion secondary batteries are the optimal solution. Further, various secondary batteries such as lithium ion secondary batteries, magnesium ion secondary batteries, and sodium ion secondary batteries have been developed. In practice, a plurality of battery units stacked and connected to form the battery cell is the most common method. The sufficient capacity is achieved to be applied for the various devices.

The heat dissipation method of the conventional battery cells is to use an additional thermal conductive metal plate/block to contact a bottom surface formed by several stacked battery units, or use an internal metal flow channel that can flow through liquid or gas to remove the heat generated by the battery cell during charging and discharging. For example, as disclosed in CN205992578U, the battery units are disposed vertically one by one to form the battery cell. Due to the terminals of the battery units are on the top, the thermal conductive metal plate/block will be disposed on the bottom of the battery units. However, due to the battery units are disposed vertically, the thermal conductive metal plate/block only can contact the bottom ends of the respective battery units. The contact area of the respective battery units is very small. The heat dissipation efficiency is very poor, and the cooling effect is not uniform.

Besides, due to the thermal conductive metal plate/block or the internal metal flow channel is added, the overall volume of the battery module is increased. The structure of the whole battery module will become more complicated. Also, the assembling process will become more complicated.

SUMMARY OF THE INVENTION

It is a primary objective of this invention to provide a battery module with cooling cartridge and battery system thereof. The cooling cartridge is directly contacted in a large area to the current collecting sheet of the battery unit to form a large-area heat dissipating path for the battery cell.

It is another objective of this invention to provide a battery module with cooling cartridge and battery system thereof. The joining portions of two adjacent battery modules are arranged to be misaligned to decrease the overall volume of the battery system.

In order to implement the abovementioned, this invention discloses a battery module with cooling cartridge, which includes a battery cell, a metal housing and at least one cooling cartridge. The battery cell is formed by a plurality of battery units stacked along with a single axis. Each battery unit is an independent and complete module, and includes two current collecting sheets and an electrochemical system disposed therebetween. The cooling cartridge includes a supporting portion and at least one wing portion extended from an edge of the supporting portion. The supporting portion of the cooling cartridge is disposed between any two of the battery units and contacts with the current collecting sheets with the same polarity of the two battery units. The wing portion contacts to an inner sidewall of the metal housing. Therefore, the large-area heat dissipating path for the battery cell is provided, and the performance and stability of the battery cell are greatly improved.

Moreover, this invention discloses a battery system composed of a plurality of above-mentioned battery modules. A joining portion is extended outwards and formed by the upper case and the lower case of the metal housing. And the joining portions of two adjacent battery modules are misaligned to decrease the overall volume of the battery system. The gap forming by the joining portions serves as a cooling channel. Therefore, additional heat dissipation system of the battery system does not need to further reduce the overall volume of the battery system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1A:
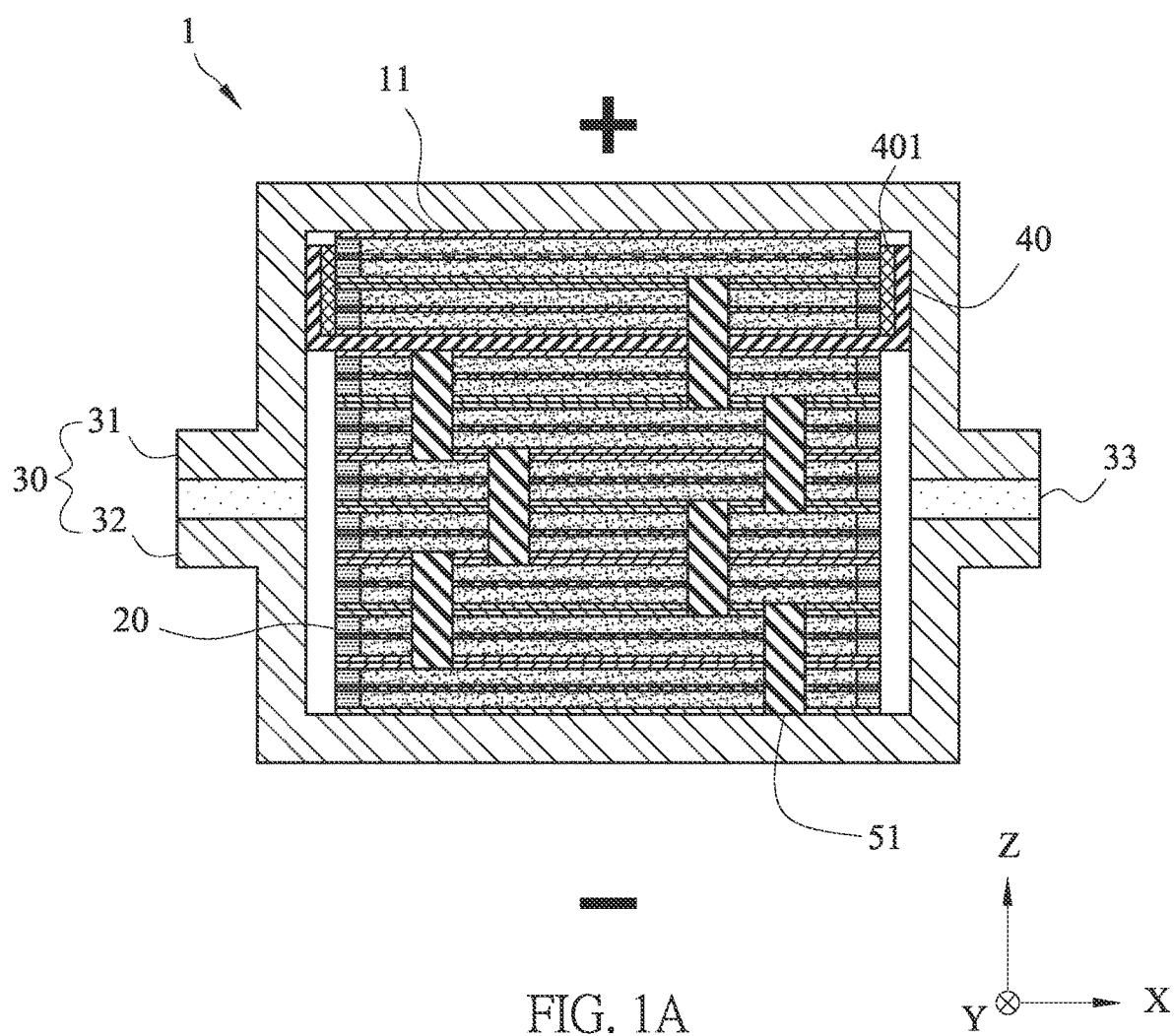
FIGS. 1A and 1B are schematic diagrams of an embodiments of the battery module with cooling cartridge of this invention.

The present invention will be described with respect to particular embodiments and with reference to certain drawings but the invention is not limited thereto but only by the claims. Any reference signs in the claims shall not be construed as limiting the scope. The drawings described are only schematic and are non-limiting. In the drawings, the size of some of the elements may be exaggerated and not drawn on scale for illustrative purposes.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the description of the present invention, it should be noted that the terms "installation", "connected", and "disposed" are to be understood broadly, and may be fixed or detachable, for example, can be mechanical or electrical, can be connected directly or indirectly, through an intermediate medium, which can be the internal connection between two components. The specific meanings of the above terms in the present invention can be understood in the specific circumstances by those skilled in the art.

Figure 1B:
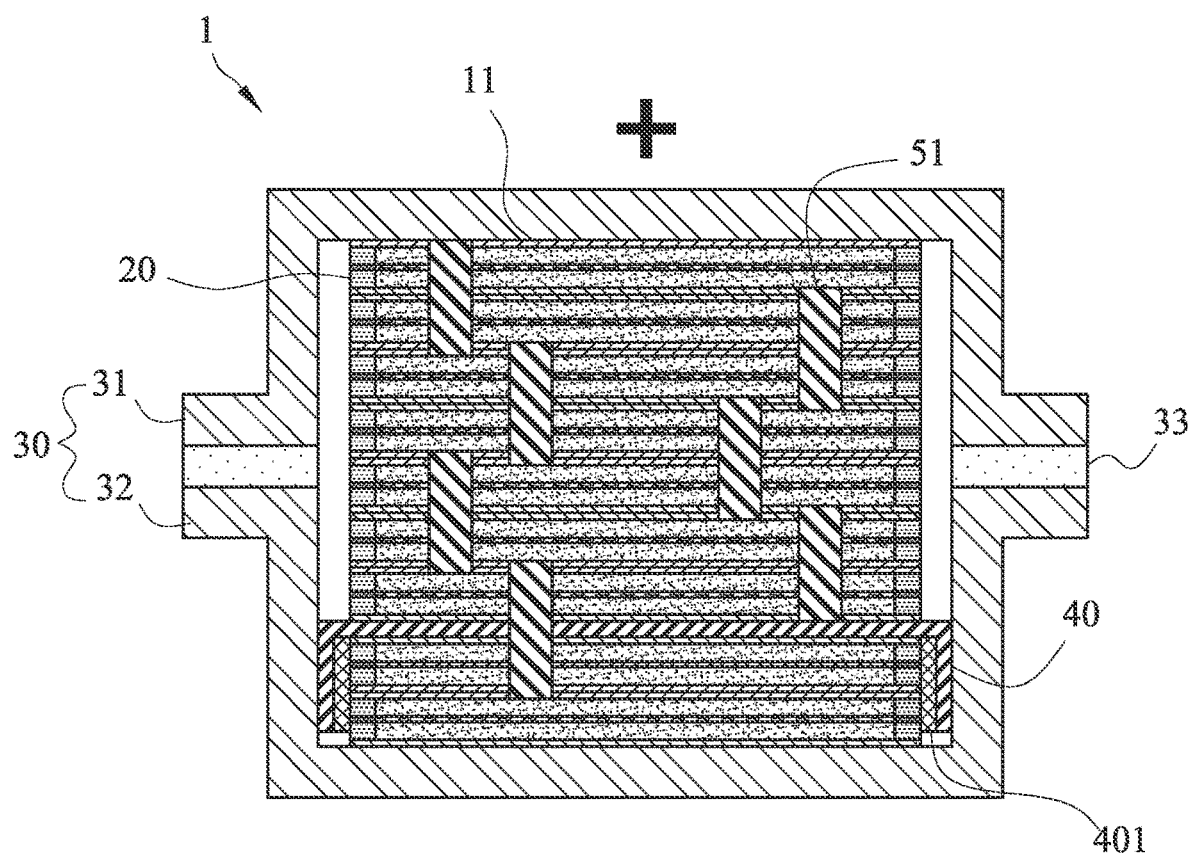

Please refer to FIGS. 1A and 1B. The invention discloses a battery module 1 with cooling cartridge, which includes a battery cell 11, a metal housing 30 and at least one cooling cartridge 40. The battery cell 11 is formed by a plurality of battery units 20 stacked along with a single axis. As shown in FIG. 1A or 1B, the battery units 20 are stacked along with a vertical Z-axis and connected together in parallel. Moreover, the battery units 20 can also be connected in series or in both series and parallel. Each battery unit 20 is an independent and complete module.

Figure 2A:
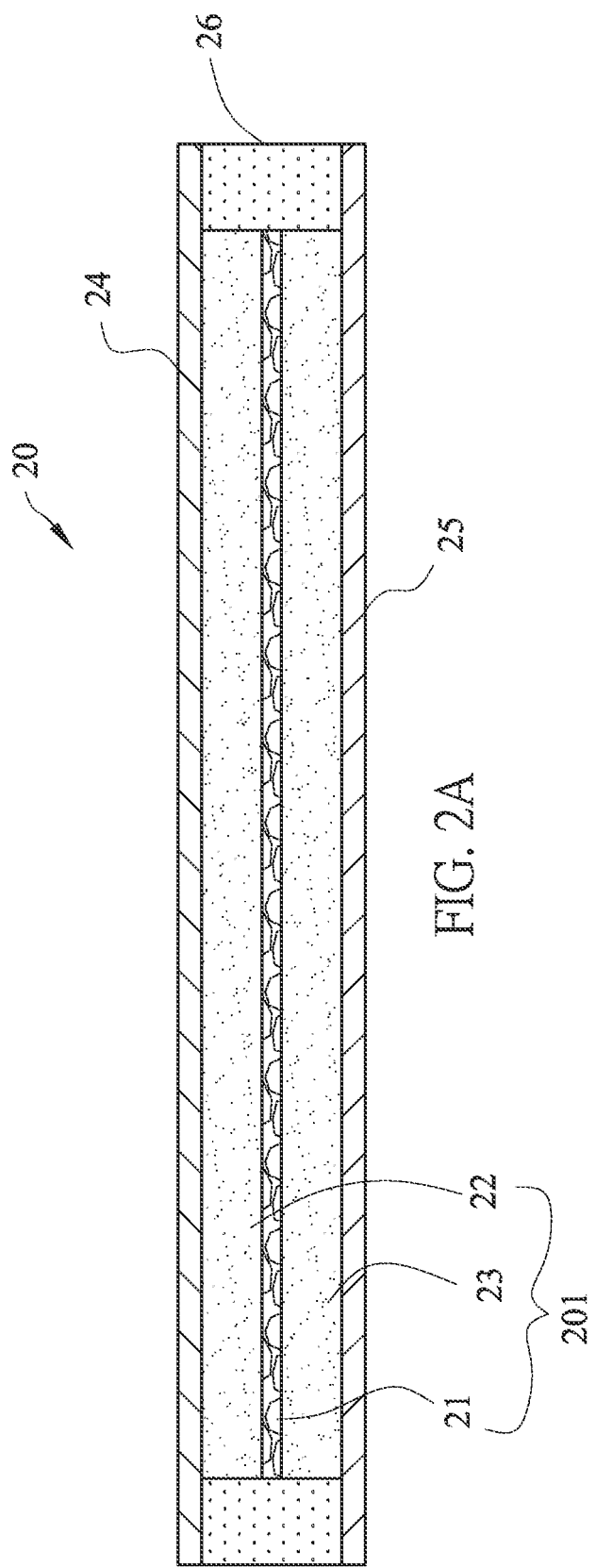
FIG. 2A is a schematic diagram of an embodiments of the battery unit of the battery module with cooling cartridge of this invention.
Figure 2B:
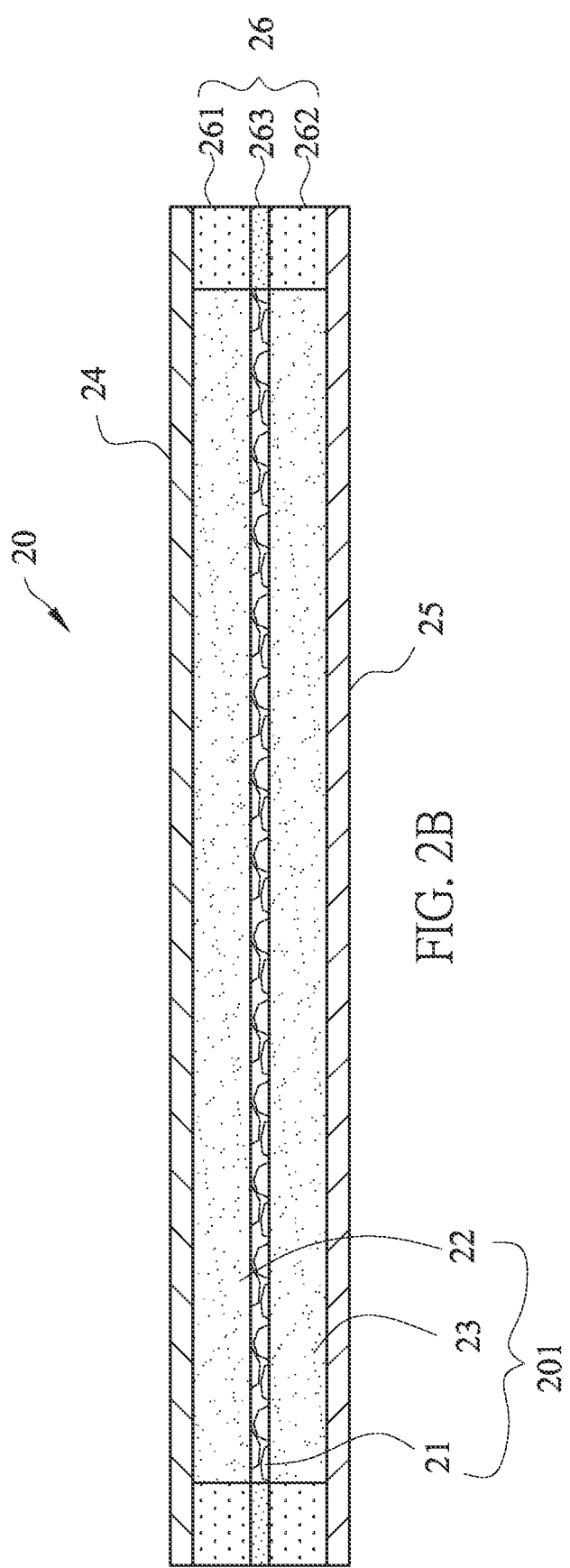
FIG. 2B is a schematic diagram of another embodiments of the battery unit of the battery module with cooling cartridge of this invention.
Figure 2C:
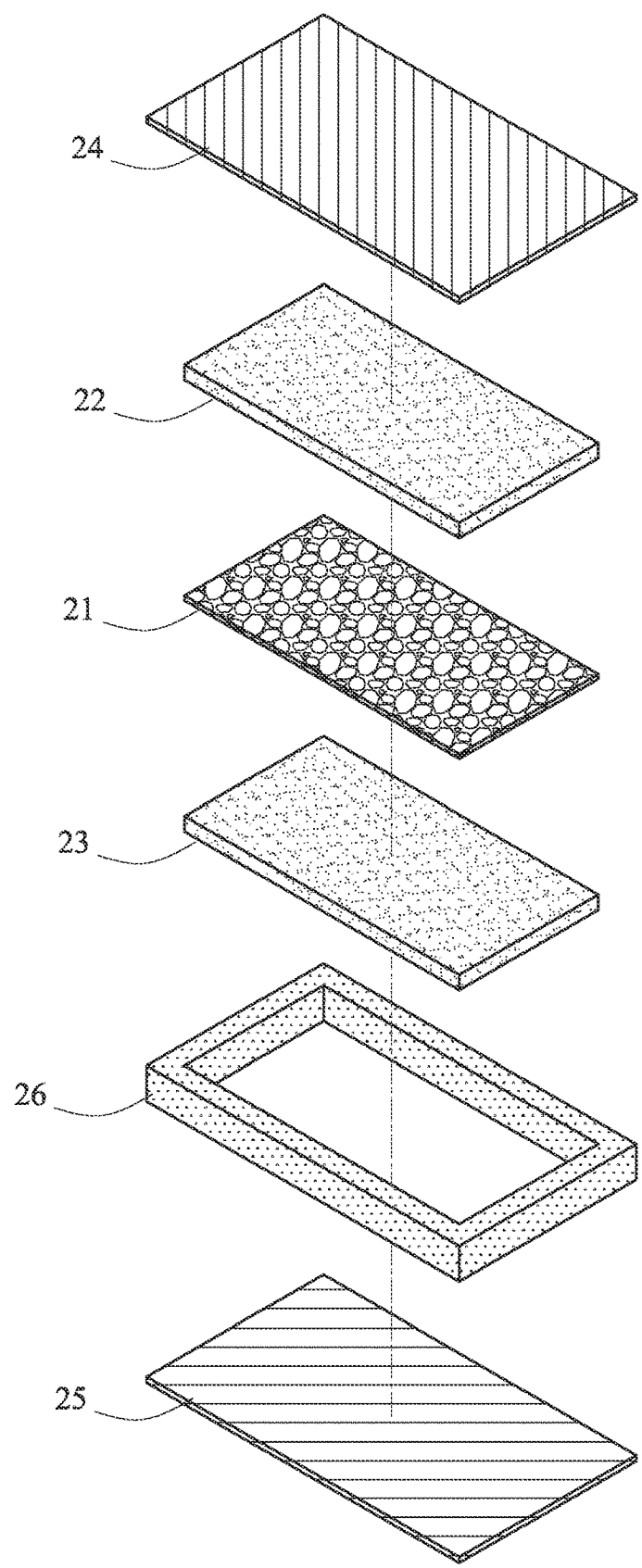
FIG. 2C is an exploded diagram of an embodiments of the battery unit of the battery module with cooling cartridge of this invention.

Please refer to FIGS. 2A and 2C. The battery cell 11 is composed of the battery units 20 with independent, sealed and complete module. The battery unit 20 includes two current collecting sheets 24, 25, an electrochemical system 201 and a sealing frame 26. The electrochemical system 201 includes a separator 21, two active material layers 22, 23 and an electrolyte system impregnated or mixed in the active material layers 22, 23. The separator 21 may be a porous lamination formed by polymers or the glass fibers, or the separator 21 may be a ceramic separator, which is stacked or sintered by ceramic materials, with pores to permit ion migrations. The pores are through holes or ant holes, i.e. non-straight through holes. Moreover, the separator 21 may be the porous lamination with a ceramic particles reinforcing layer, or a separator mixing with ceramic particles and ion-conductive polymers. The size of the ceramic particles are nanometer scale, micrometer scale or mixing with at least two larger different scale, such as mixing with nanometer scale and micrometer scale. The material of the ceramic particles is $TiO_2$, $Al_2O_3$, $SiO_2$, alkylated ceramic particulates, or an oxide-based solid electrolyte, such as LLZO (lithium lanthanum zirconium oxide, $Li_7La_3Zr_2O_{12}$) or LATP($Li_{1+x}Al_xTi_{2-x}(P_4)_3$). Further, the ceramic material may be mixed with the ceramic insulating materials and the oxide-based solid electrolyte. The separator 21, in case of being stacked by ceramic materials, may further include a polymer adhesive used to bind these ceramic particles. The polymer adhesive may be polyvinylidene fluoride (PVDF), polyvinylidene fluoride co-hexafluoropropylene (PVDF-HFP), Polytetrafluoroethene (PTFE), acrylic acid glue, epoxy resin, polyethylene oxide (PEO), polyacrylonitrile (PAN), and polyimide (PI).

The electrolyte system is impregnated or mixed in the active material layers 22, 23. The electrolyte system is a gel electrolyte, a liquid electrolyte, a solid electrolyte or a combinations thereof. The active material layers 22, 23 are separated by the separator 21 to form the electrochemical system 201. Therefore, the processes that the chemical energy is converted into electrical energy, i.e. discharging, and the electrical energy is converted into chemical energy, i.e. charging, are carried out. The ion migration and transport are achieved. The electric charges are transmitted via the current collecting sheets 24, 25. The materials of the current collecting sheets 24, 25 are copper (Cu), Aluminum (Al), or nickel (Ni), tin (Sn), silver (Ag), gold (Au), or an alloy comprised of at least one of the foregoing metals.

Also, the two current collecting sheets 24, 25 and the sealing frame 26 serve as a package structure of the battery unit 10. The sealing frame 26 is made of the polymer material. As long as it can be adhered to the surfaces of the current collecting sheets 24, 25 and is durable to the electrolyte system, there do not have any particular requirements for the polymer material, but the thermosetting resin is preferred. For example, the materials of the sealing frame 26 include the epoxy, polyethylene (PE), polypropylene (PP), polyurethane (PU), thermoplastic polyimide (TPI), silicone, acrylic resin and/or ultraviolet light curing adhesive. The sealing frame 26 is disposed between the edges of the two current collecting sheets 24, 25 and surrounds the electrochemical system 201, i.e. the two active material layers 22, 23 and the separator 21 disposed therebetween. Also, the sealing frame 26 adheres the two current collecting sheets 24, 25 and seals the electrolyte system therebetween to avoid leakage. Therefore, due to seal by the sealing frame 26, the electrolyte system does not contact with the electrolyte system of another battery unit. For example, i.e. the electrolyte system do not circulate between any adjacent battery units 20. In other words, the electrolyte system only circulates within respective battery units 10. Therefore, the two current collecting sheets 24, 25 and the sealing frame 26 serve as the package structure of the battery unit 20 to form an independent, sealed and complete module, which can generate power independently.

To enhance adhesion of the sealing frame 26, in case of the silicone is utilized, the sealing frame 26 may include two modified silicone layers 261, 262 and a silicone layer 263 disposed between the two modified silicone layers 261, 262. Please see FIG. 2B, the modified silicone layers 261, 262 are modified by adjusting a proportion of condensation-type silicone and addition-type silicone comparing to the silicone layer 263 to enhance adhesion for different material, i.e. the material of the current collecting sheets 24, 25. Therefore, the adhesion between the interfaces of the current collecting sheets 24, 25 and the sealing frame 26 is enhanced. The overall appearance is more complete and the production yield is improved.

Please refer to FIGS. 1A and 1B, the metal housing 30 includes an upper case 31 and a lower case 32. An electrically insulating plate 33 is disposed between the upper case 31 and the lower case 32 to avoid the upper case 31 be electrically connected to the lower case 32. In other words, the upper case 31 and the lower case 32 are electrically insulated from one another. The electrically insulating plate 33 is made of electrically insulating materials and may be an O-ring or a washer. The metal housing 30 is utilized to encapsulate or seal the battery cell 11 inside. The upper case 31 and the lower case 32 are electrically connected to the outputs of the battery cell 11 with different polarity respectively to form a positive terminal and a negative terminal. As shown in the figures, the positive terminal is formed by the upper case 31 and the negative terminal is formed by the lower case 32. The cooling cartridge 40 is inserted and disposed between any two of the battery units 20 to provide a large-area heat dissipating path. Please refer to FIG. 3A, the cooling cartridge 40 includes a supporting portion 41 and at least one wing portion 42 extended from an edge of the supporting portion 41. As shown in this figure, two wing portions 42 are extended from two opposite edges of the supporting portion 41 to form a U-shaped cooling cartridge 40. Also, please refer to FIG. 3B, there may have four wing portions 42 extended from all the edges of the supporting portion 41. The shape and amount for the wing portions 42 in the figures are used for illustrative purpose only, but not limited to these shape and amount.

Figure 3A:
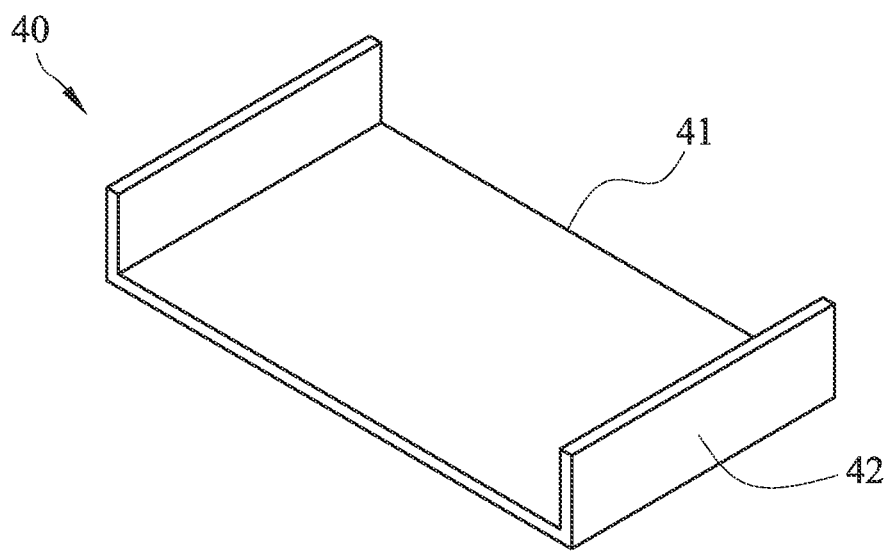
FIGS. 3A and 3B are schematic diagrams of an embodiments of the battery module with cooling cartridge of this invention.

Please see FIGS. 1A and 3A, the cooling cartridge 40 is made of the high thermal conductive metal materials. The area of the supporting portion 41 of the cooling cartridge 40 is slightly greater than the area of any one of the current collecting sheets 24, 25 of the battery units 20. Therefore, the battery unit 20 is supported on the supporting portion 41 of the cooling cartridge 40, and the supporting portion 41 of the cooling cartridge 42 is directly contacted in a large area to the current collecting sheet 24, 25 of the battery unit 20. The wing portion 42 is vertically extended, such as in an upward direction in the figure, and directly contacts to the inner sidewall of the metal housing 30, such as the upper case 31 in the figure. Therefore, the thermal energy generated by the battery cell 11 during charging and discharging is dissipated to the outside through the cooling cartridge 40 and the metal housing 30. The battery units 20 are supported by the supporting portion 41 of the cooling cartridge 40 via the current collecting sheets 24, 25. Therefore, the contact areas thereof are very large. Also, the wing portions 42 of the cooling cartridges 40 are vertically extended and extending upward or downward. Therefore, the wing portions 42 are contacted with the inner sidewall of the metal housing 30 by their surfaces with largest areas, i.e. not by the end or edge surface. Therefore, the heat dissipation efficiency of the cooling cartridge 40 is very well.

Moreover, as shown in FIG. 1A, the battery units 20 are stacked vertically to form the battery cell 11. The both sides of the supporting portion 41 of the cooling cartridge 40 are contacted with the battery units 20. The cooling cartridge 40 is electrically conductive. Therefore, the both sides of the supporting portion 41 of the cooling cartridge 40 have to be contacted with the current collecting sheet 24, 25 with the same polarity of the battery unit 20 and the wing portions 42 of the cooling cartridge 40 have to contact the upper case 31 or the lower case 32 with the same polarity. In other words, the cooling cartridge 40 can be used as an electrical conductor. Also, an electrically insulating layer 401 is disposed on an inner side of the wing portion 401 to avoid the wing portion 42 being contact with the side surface of the battery unit 20.

Take the embodiment of FIG. 1A for example, the cooling cartridge 40 is disposed in the positive side, i.e. contacted to the inner sidewall of the upper case 31. The both sides of the supporting portion 41 of the cooling cartridge 40 are contacted with the current collecting sheet 24, 25 with the same polarity. Also, the battery units 20 are contacted to each other with a back-to-front stacking relationship. The connecting plates 51 are used to connect the current collecting sheet 24, 25 with the same polarity to form a parallel connection arrangement. On the other hand, please refer to FIG. 1B, the cooling cartridge 40 may be disposed in the negative side. The arrangement and connections are similar, so that the repeated description is omitted.

Figure 3B:
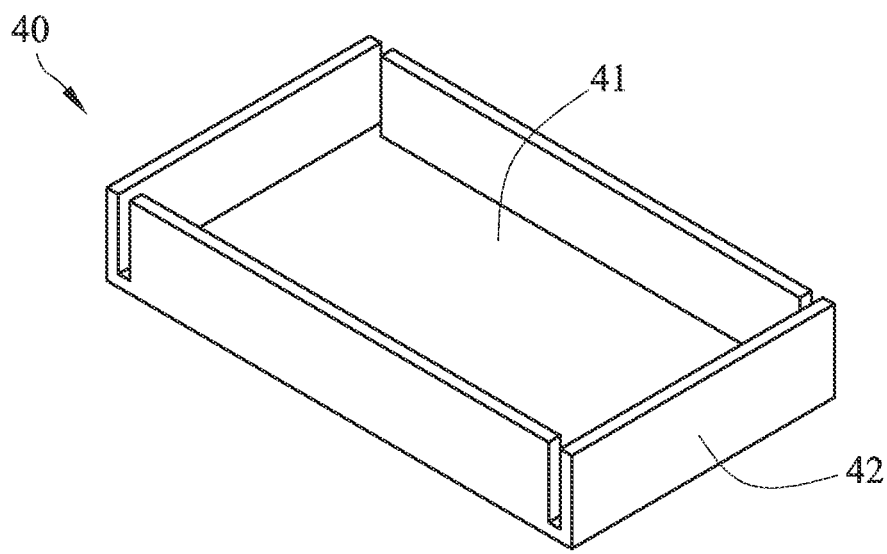
Figure 4A:
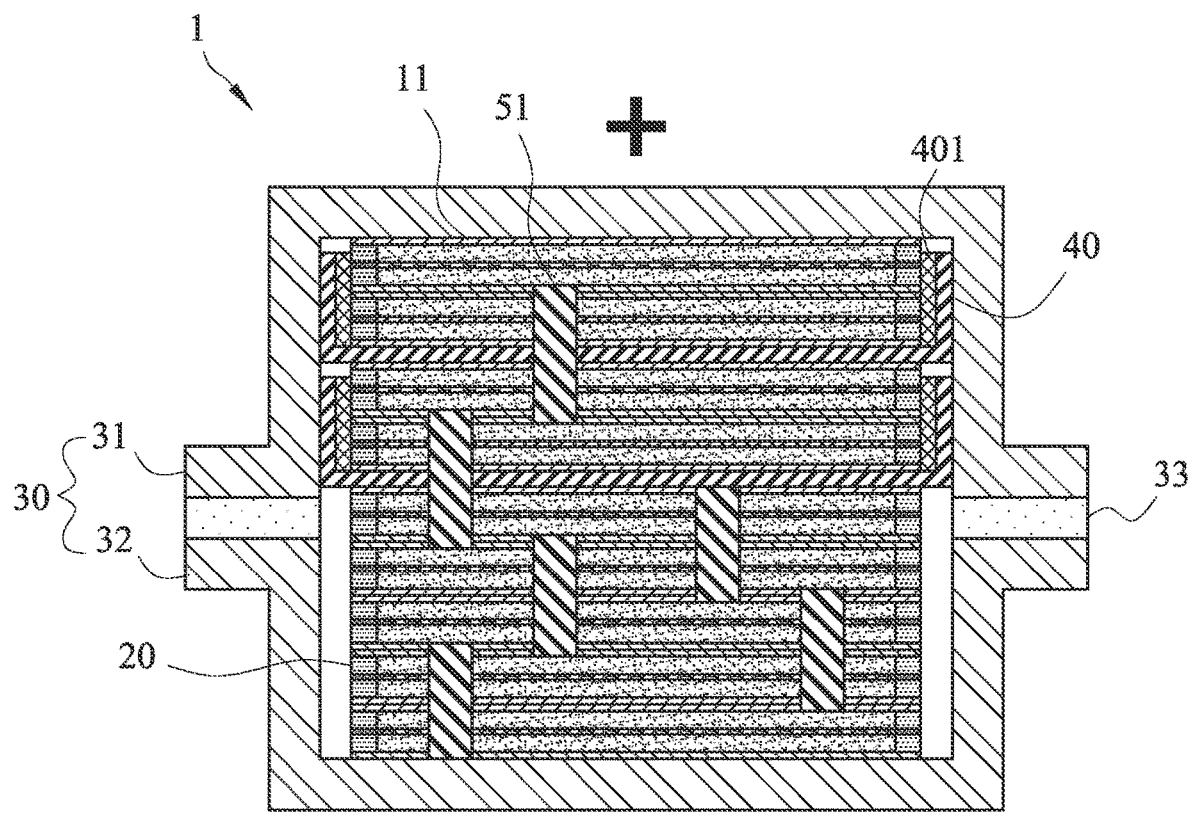
FIGS. 4A and 4B are schematic diagrams of another embodiments of the battery module with cooling cartridge of this invention.
Figure 4B:
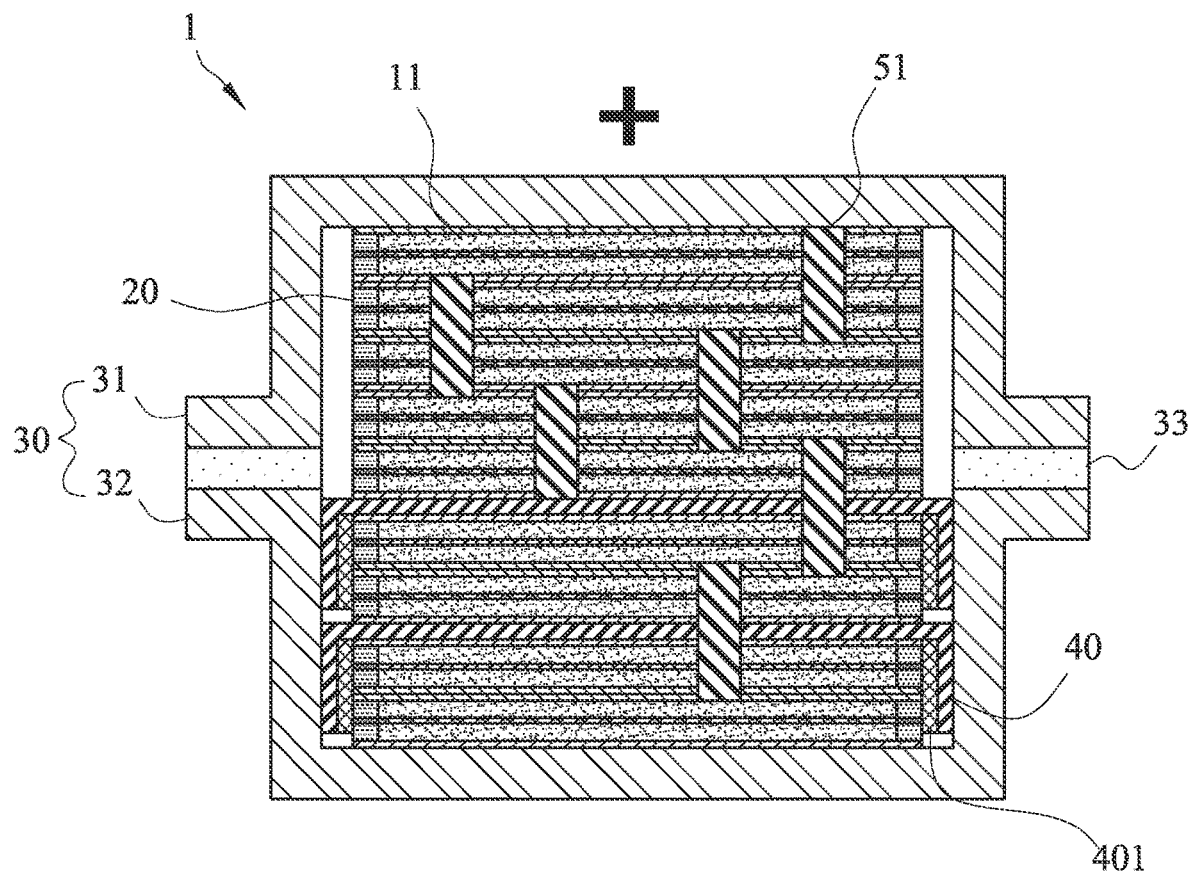

Please see FIGS. 4A and 4B, there may also have more than one cooling cartridges 40 within one side, either the upper case 31 or the lower case 32. As shown, there have two cooling cartridges 40 within the positive side of the upper case 31 or the negative side of the lower case 32 respectively. The two sets of the battery units 20, which are connected in parallel, are connected via the connecting plates 51 to form a parallel connection arrangement. The connecting plate 51 is passed through the side without wing portion 42 of the cooling cartridge 40. As shown in FIG. 3A, the connecting plats 51 may pass through the top right side or the bottom left side. Also, in case of the cooling cartridge 40 has the wing portions 42 of all the four sides, such as shown in FIG. 3B, one of the wing portions 42 may have a slot to allow the connecting plat 51 to pass through. The amount and positions for the cooling cartridge 40 in the figures are used for illustrative purpose only, but not limited to these amount and positions.

Figure 5A:
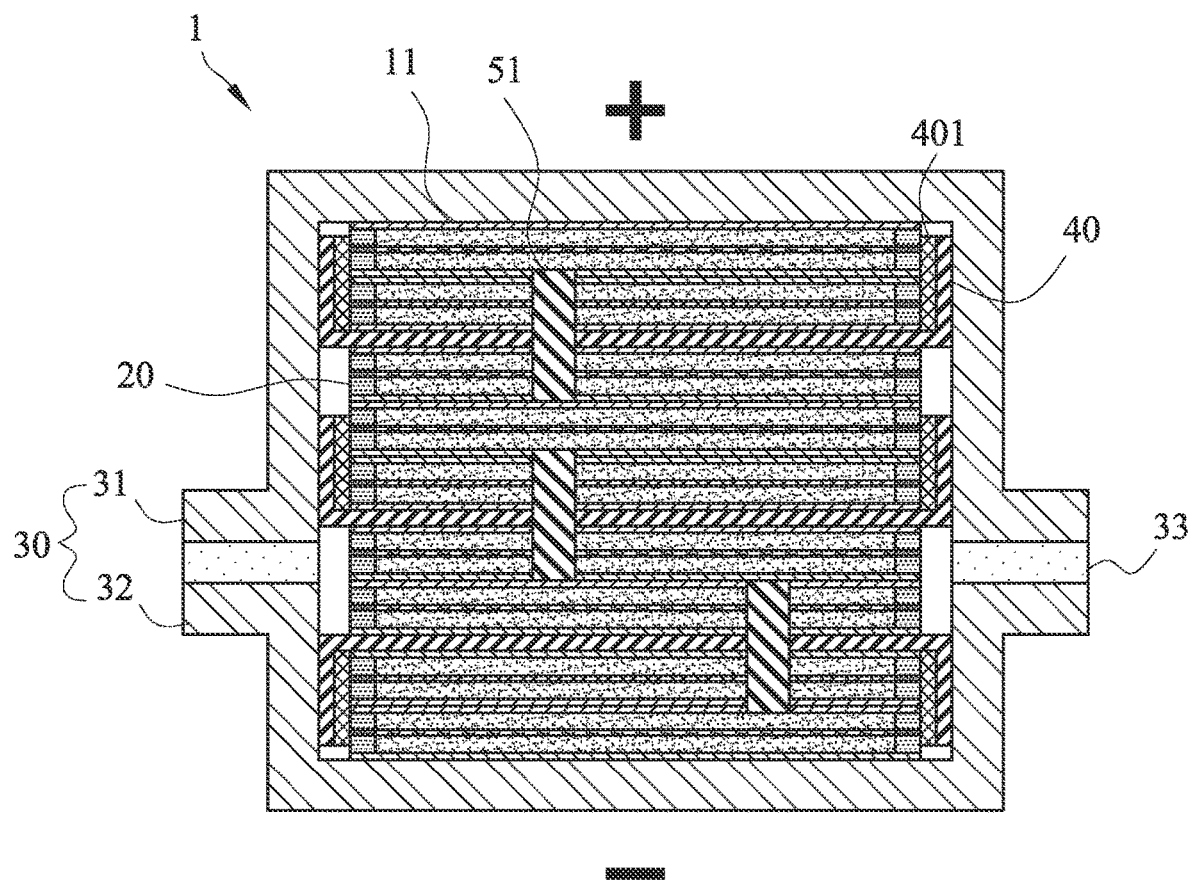
FIGS. 5A and 5B are schematic diagrams of another embodiments of the battery module with cooling cartridge of this invention.
Figure 5B:
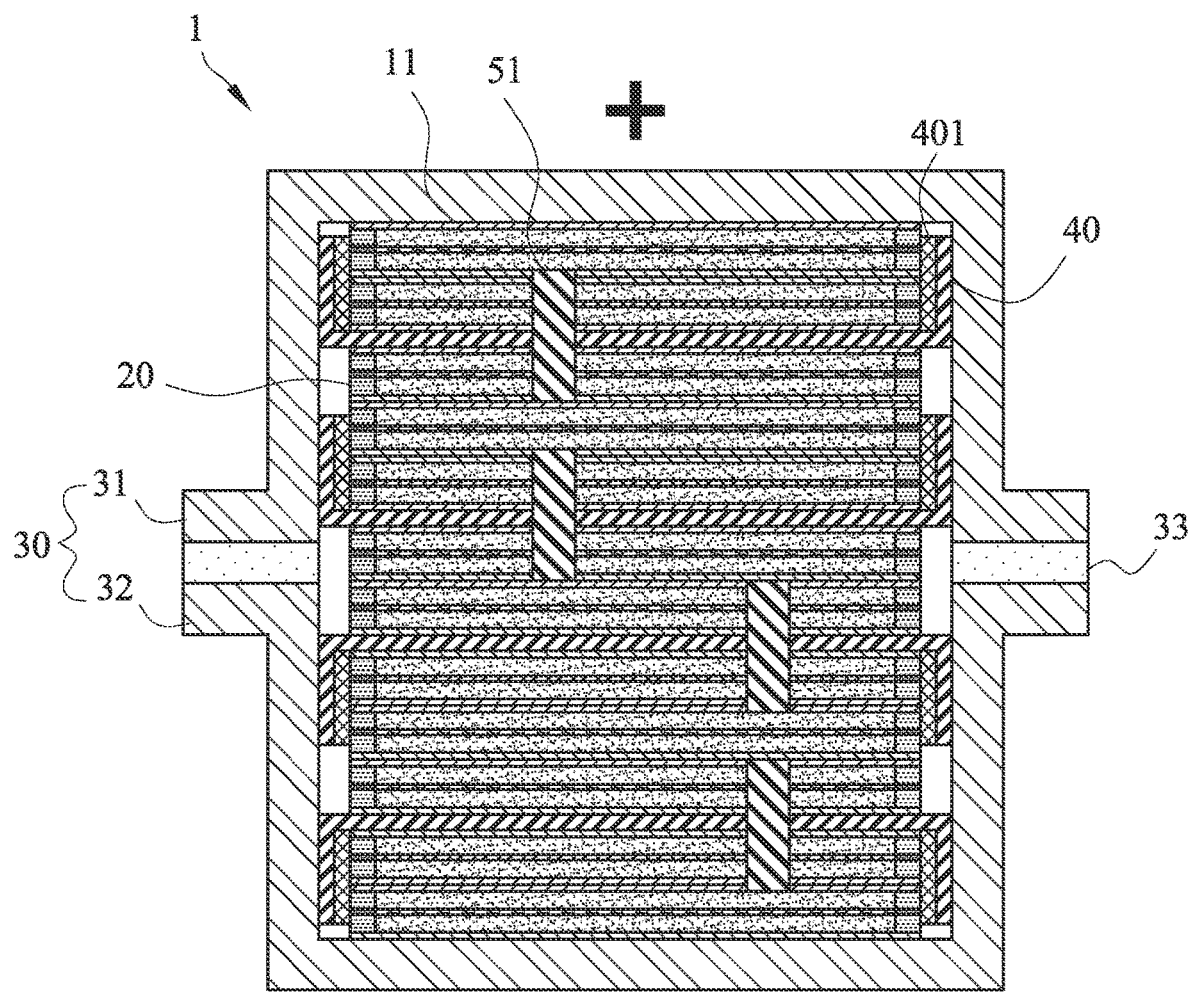

Also, excepting for the aforementioned stacking in the same orientation, the battery units 20 can be stacked in both series and parallel connections. Please refer to FIG. 5A, the battery units 20 are stacked in both series and parallel connections. Three battery units 20 are formed a group, and each group has a respective cooling cartridge 40. Within the group, the three battery units 20 are arranged in back-to-front stacking relationship. The connecting plates 51 is also adapted to form a parallel connection within the group. Then, three groups are stacked in the same orientation to form the series connection outside the groups. Please be noted, the parallel connection within the group means that the three battery units 20 within this group are connected in parallel. And, the series connection outside the groups means that the three groups are connected in series. For the lowest group, it is located at the negative side, i.e. the lower case 32. Therefore, the location and the orientation of the cooling cartridge 40 is different from that of the other groups. Moreover, please refer to FIG. 5B, there have four groups in the metal housing 30. Two groups are located at the positive side, i.e. the upper case 31, and another two groups are located at the negative side, i.e. the lower case 32. The connections are the same with the above-mentioned connections, so that the repeated description is omitted.

Figure 6A:
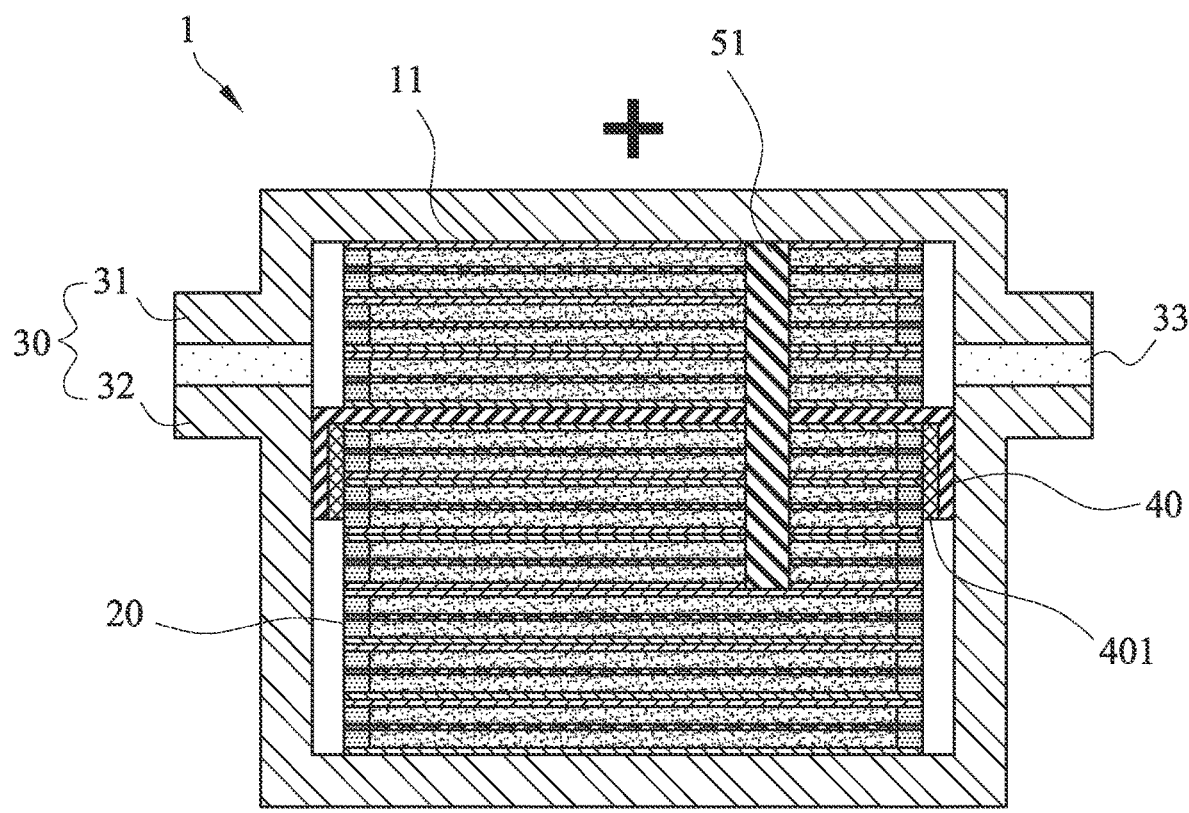
FIGS. 6A and 6B are schematic diagrams of another embodiments of the battery module with cooling cartridge of this invention.
Figure 6B:
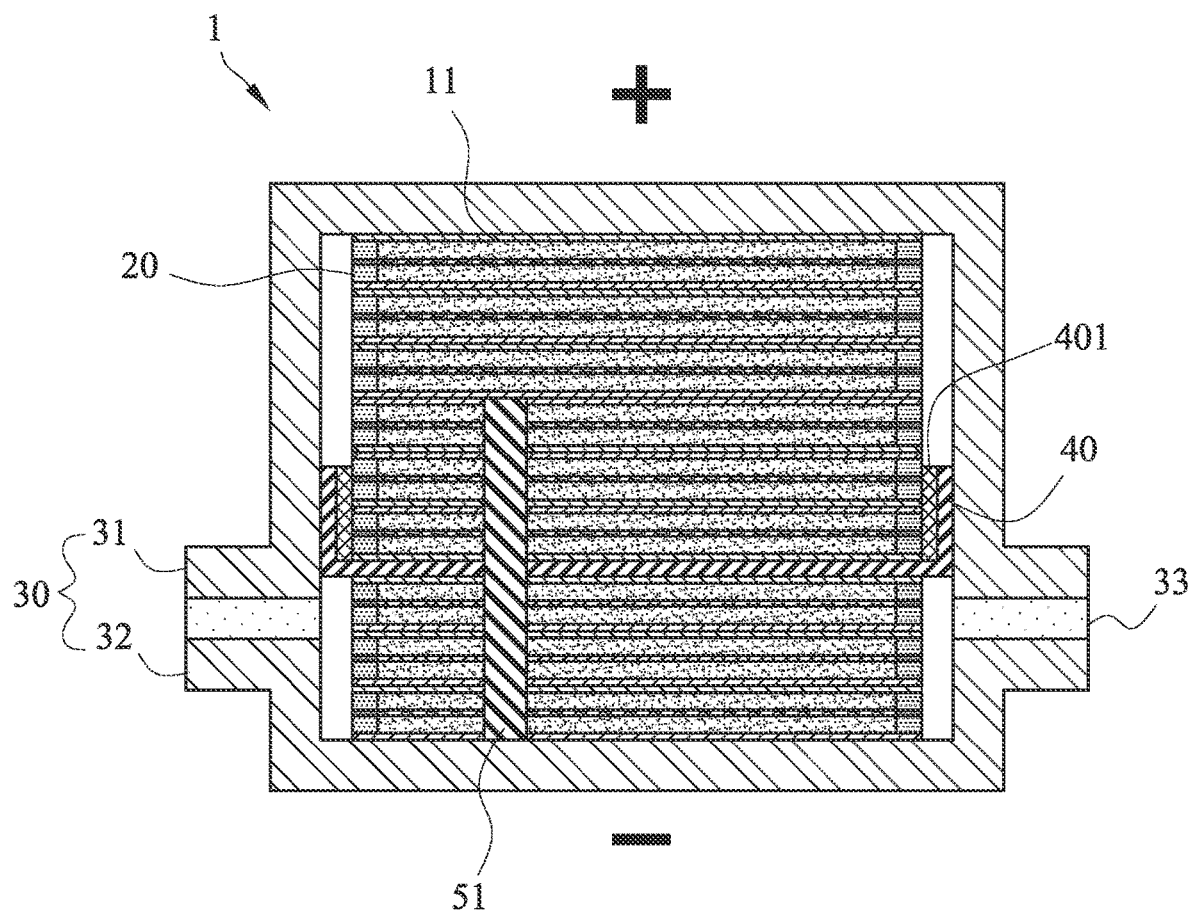

On the other hand, please refer to FIGS. 6A and 6B, three battery units 20 are formed a group. And the three battery units 20 are stacked in the in the same orientation to form the series connection within this group. Then, three groups are arranged in back-to-front stacking relationship, and the connecting plates 51 is adapted to form the parallel connection outside the groups. Furthermore, the battery units 20 are stacked along with a single axis to form the battery cell 20. The arrangements are not limited to the above-mention arrangements.

Figure 7:
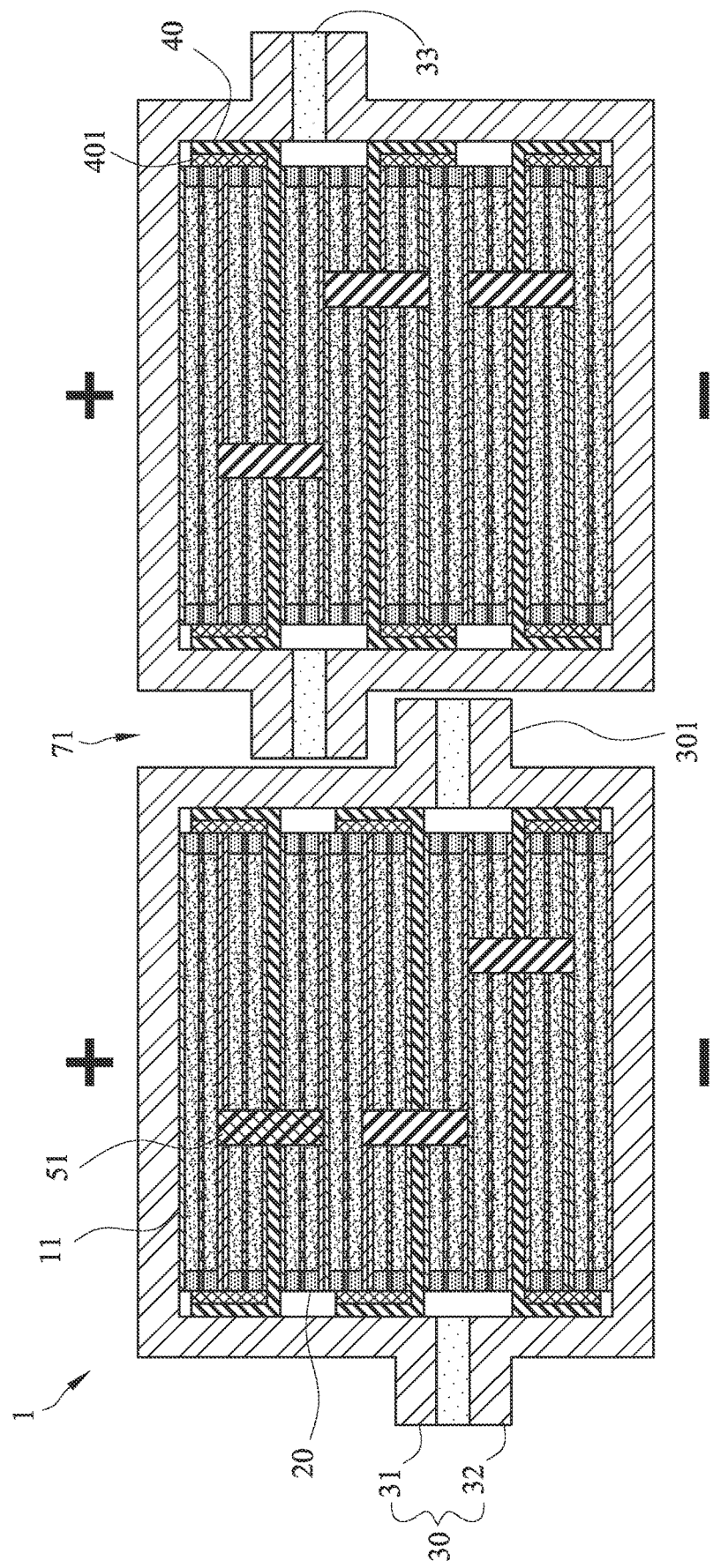
FIG. 7 is a schematic diagram of an embodiments of the battery system composed of the battery modules with cooling cartridge of this invention.

Please refer to FIG. 7, the battery system of this invention is composed of a plurality of above-mentioned battery modules 1. The electrically insulating plate 33 is disposed between the upper case 31 and the lower case 32. The upper case 31 and the lower case 32 are electrically insulated from one another. A joining portion 301 is extended outwards and formed by the upper case 31 and the lower case 32 of the metal housing 30 and the electrically insulating plate 33. The joining portions 301 of two adjacent battery modules 1 are misaligned to decrease the overall volume of the battery system. Also, the volumetric energy density is increased. Excepting for the large-area heat dissipating path provided by the cooling cartridge 40 for the battery cell 11, the gap forming by the joining portions 301 outsides of the battery units 1 serves as a cooling channel 71. Therefore, additional heat dissipation system of the battery system does not need to further reduce the overall volume of the battery system. Also, there only have two battery modules 1 in this figure. In practice, there may have more battery modules 1 to be arranged in horizontal direction according to requirements.

Accordingly, the invention provides a battery module with cooling cartridge and battery system thereof. The cooling cartridge is directly contacted in a large area to the current collecting sheet of the battery unit to form a large-area heat dissipating path for the battery cell. The thermal energy generated by the battery cell is dissipated to maintain the optimized performance of the battery cell. In the battery system composed of a plurality of above-mentioned battery modules, the joining portions of two adjacent battery modules are misaligned to decrease the overall volume of the battery system. The gap forming by the joining portions serves as a cooling channel. Therefore, additional heat dissipation system of the battery system does not need to further reduce the overall volume of the battery system. Besides, the cooling cartridge of the invention can also be used as an electrical conductor to transmit electricity between the stacked battery units and case.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery module with cooling cartridge, comprising:
a battery cell, including a plurality of battery units stacked along with a single axis, each battery unit including:
two current collecting sheets, disposed in parallel to each other and serving as a package structure of the battery unit; and
an electrochemical system, disposed between the two current collecting sheets and including an electrolyte system, wherein the electrolyte system does not contact with the electrolyte system of another battery unit;
a metal housing, encapsulating the battery cell inside and including an upper case and a lower case, wherein the upper case and the lower case are electrically insulated from one another, and the upper case and the lower case are electrically connected to outputs of the battery cell with different polarity respectively to form a positive terminal and a negative terminal; and
at least one cooling cartridge, including a supporting portion and at least one wing portion extended from an edge of the supporting portion, wherein the supporting portion is disposed between two of the battery units and contacts with the current collecting sheets with the same polarity of the two battery units, and the wing portion contacts to an inner sidewall of the metal housing.

2. The battery module with cooling cartridge of claim 1, wherein an electrically insulating layer is disposed on an inner side of the wing portion to avoid the wing portion being contact with a side surface of the battery unit.

3. The battery module with cooling cartridge of claim 1, wherein an electrically insulating plate is disposed between the upper case and the lower case to avoid the upper case being electrically connected to the lower case.

4. The battery module with cooling cartridge of claim 1, wherein an area of the supporting portion is the cooling cartridge is greater than an area of any one of the current collecting sheets of the battery units.

5. The battery module with cooling cartridge of claim 1, wherein the electrolyte system is a gel electrolyte, a liquid electrolyte, a solid electrolyte or a combination thereof.

6. The battery module with cooling cartridge of claim 1, wherein the electrolyte system only circulates within respective battery units, and only charge transfer is occurred between adjacent two of the battery units without occurring electrochemical reactions therebetween.

7. The battery module with cooling cartridge of claim 1, wherein the electrochemical system comprises:
two active material layers, being in contact with the two current collecting sheets respectively;
a separator, disposed between the two active material layers; and
a sealing frame, disposed between the two current collecting sheets and surrounding the electrochemical system.

8. The battery module with cooling cartridge of claim 7, wherein the sealing frame includes a silicone layer and two modified silicone layers disposed on two sides of the silicone layer.

9. A battery system composed of a plurality of battery modules of claim 1, wherein a joining portion is extended outwards and formed by the upper case and the lower case of the metal housing, and wherein the joining portions of two adjacent battery modules are misaligned.

* * * * *